(12) United States Patent
Shen et al.

(10) Patent No.: US 12,442,968 B2
(45) Date of Patent: Oct. 14, 2025

(54) ELECTRONIC DEVICE

(71) Applicant: InnoLux Corporation, Miao-Li County (TW)

(72) Inventors: Ling-Chieh Shen, Miao-Li County (TW); Ting-Ying Wu, Miao-Li County (TW); Yang-Ruei Li, Miao-Li County (TW); Wen-Yu Lin, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/915,674

(22) Filed: Oct. 15, 2024

(65) Prior Publication Data

US 2025/0035832 A1 Jan. 30, 2025

Related U.S. Application Data

(63) Continuation of application No. 18/464,526, filed on Sep. 11, 2023, now Pat. No. 12,147,069.

(30) Foreign Application Priority Data

Oct. 11, 2022 (CN) .......................... 202211243967.3

(51) Int. Cl.
*F21V 8/00* (2006.01)

(52) U.S. Cl.
CPC ......... *G02B 6/0026* (2013.01); *G02B 6/0025* (2013.01); *G02B 6/003* (2013.01);
(Continued)

(58) Field of Classification Search
CPC ........ G02B 5/0284; G02B 5/26; G02B 5/282; G02B 6/0055; G02B 6/0031; G02F 1/133553; F21V 8/00

See application file for complete search history.

(56) References Cited

U.S. PATENT DOCUMENTS

2001/0035923 A1* 11/2001 Cha ................... G02F 1/133308
349/65
2007/0153539 A1  7/2007 Mikami
(Continued)

FOREIGN PATENT DOCUMENTS

| TW | M623293 U | 2/2022 |
|---|---|---|
| WO | 2017176691 A1 | 10/2017 |
| WO | 2022137060 A1 | 6/2022 |

*Primary Examiner* — William J Carter
(74) *Attorney, Agent, or Firm* — Muncy, Geissler, Olds & Lowe, P.C.

(57) ABSTRACT

An electronic device includes a back board, plurality of light emitting units arranged on the base, an optical film arranged on the plurality of light emitting units, and a reflective component arranged on the base and including a first surface. The back board includes a base, a side portion, and a top portion, wherein in a cross section view, an extension direction of the side portion is different from an extension direction of the base and an extension direction of the top portion; wherein an end of the side portion is connected to the base and another end of the side portion is connected to the top portion. Wherein in a normal direction of the electronic device, a distance between a top surface of the top portion to a top surface of the base is greater than a distance between a top surface of the optical film to the top surface of the base, and a thickness of the reflective component is less than or equal to a thickness of the side portion; wherein a color measurement according to the CIE, the first surface of the reflective component has a brightness ranging from 70 to 100, a first chromaticity ranging from −10 to 10, and a second chromaticity ranging from −10 to 10.

6 Claims, 6 Drawing Sheets

(52) U.S. Cl.
CPC ......... *G02B 6/0031* (2013.01); *G02B 6/0068* (2013.01); *G02B 6/0076* (2013.01)

(56) References Cited

U.S. PATENT DOCUMENTS

| | | |
|---|---|---|
| 2020/0264361 A1 | 8/2020 | Yuan |
| 2024/0036235 A1* | 2/2024 | Wheatley ............... G02B 5/223 |
| 2024/0118477 A1 | 4/2024 | Shen et al. |

* cited by examiner

ELECTRONIC DEVICE

CROSS-REFERENCE TO RELATED APPLICATIONS

This application claims the benefits of the Chinese Patent Application Serial Number 202211243967.3, filed on Oct. 11, 2022, the subject matter of which is incorporated herein by reference.

This application is a continuation (CA) of U.S. Patent application for "backlight module", U.S. application Ser. No. 18/464,526 filed Sep. 11, 2023, and the subject matter of which is incorporated herein by reference.

BACKGROUND

Field of the Disclosure

The present disclosure relates to the backlight technology and, more particularly, to the technology that can mitigate the problem of darkening or chromatic aberration in the edge area.

Description of Related Art

The existing electronic device (such as the display device) may have a backlight module and, when a mini light emitting diode (mini LED) is used as a light source for the backlight module, since the light source emitted by the mini LED is a single color, such as blue light, the edge area of the backlight module often suffers from optical quality degradation due to incomplete conversion of some light sources into white light, resulting in problems of chromatic aberration and bluish edge area, for example.

In the prior art, yellow ink is arranged inside the backlight module to reduce the bluishness of the edge area, which however may cause the edge area to be dark or yellowish at a specific viewing angle. Although, in the prior art, the aforementioned problems may be mitigated by adjusting the film spacing inside the backlight module or adjusting the color of the back frame of the backlight module, these designs are not suitable for electronic devices with narrow bezels. Alternatively, although the aforementioned problems may also be solved by adjusting the design of the lamp board of the backlight module in the prior art, the production cost of this design is too high, which cannot meet the needs of the industry.

Therefore, there is a need to have an improved backlight module to mitigate and/or obviate the aforementioned problems.

SUMMARY

The present disclosure provides a backlight module, which comprises: a back board including a side wall; a lamp board arranged on the back board and including a plurality of light emitting units; a wavelength conversion film arranged on the light emitting units; at least one optical film arranged on the wavelength conversion film; a coating layer arranged on one of the at least one optical film and adjacent to an edge of the optical film; and a reflective component arranged between the side wall and the at least one optical film, and surrounding the wavelength conversion film and the at least one optical film, wherein, at an optical wavelength of 450 nanometers, a brightness of a first surface of the reflective component is between 70 and 100, a first chromaticity of the first surface is between −10 and 10, and a second chromaticity of the first surface is between −10 and 10.

The present disclosure further provides a backlight module, which comprises: a back board including a side wall; a lamp board arranged on the back board and including a plurality of light emitting units; a wavelength conversion film arranged on the light emitting units; at least one optical film arranged on the wavelength conversion film; and a reflective component arranged between the side wall and the at least one optical film and surrounding the wavelength conversion film and the at least one optical film, wherein, at an optical wavelength of 450 nanometers, a brightness of a first surface of the reflective component is between 70 and 100, a first chromaticity of the first surface is between −10 and 10, and a second chromaticity of the first surface is between 10 and 40.

Other novel features of the disclosure will become more apparent from the following detailed description when taken in conjunction with the accompanying drawings.

BRIEF DESCRIPTION OF DRAWINGS

FIG. 1 is a schematic diagram of an electronic device using the backlight module according to an embodiment of the present disclosure;

DETAILED DESCRIPTION OF EMBODIMENT

Figure 1:
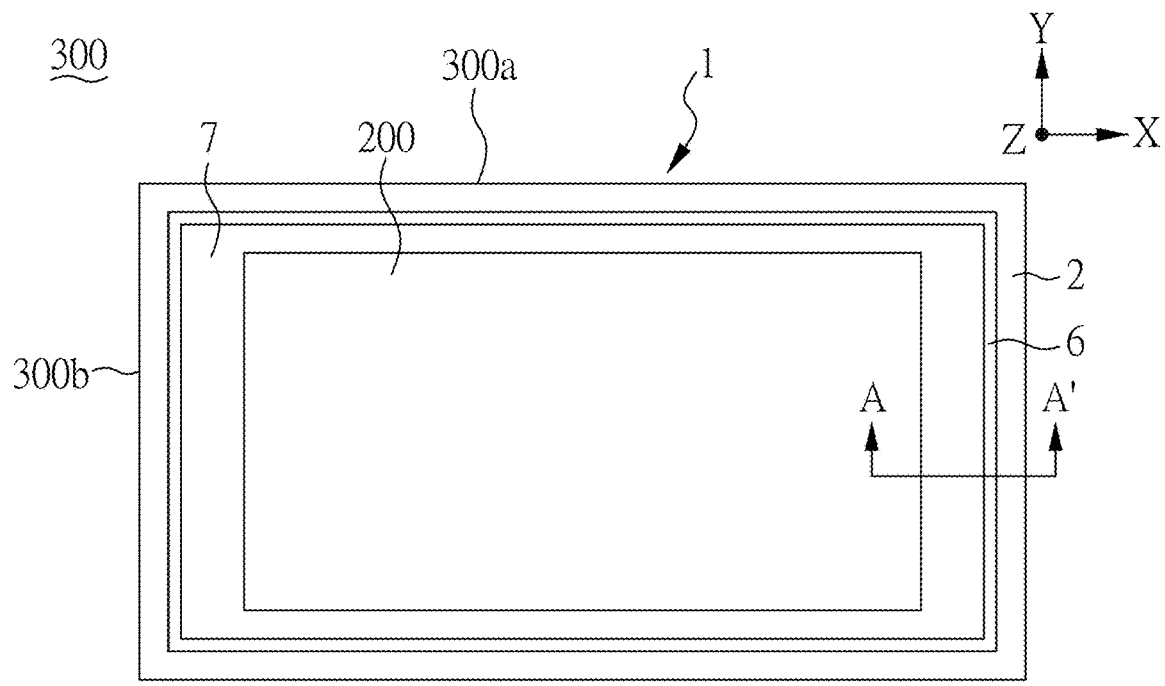
FIG. 1 is a three-dimensional schematic diagram of part of an electronic device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It is noted that, in the specification and claims, unless otherwise specified, having "one" element is not limited to having a single said element, but one or more said elements may be provided. In addition, the description of "at least one of the element 'a' and the element 'b'" includes an aspect with only the element 'a', an aspect with only the element 'b', and an aspect with both the element 'a' and the element 'b'.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. These ordinal numbers are used only to distinguish one element with a particular name from another element with the same name.

In addition, the term "adjacent" used herein may refer to describe mutual proximity and does not necessarily mean mutual contact.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection, or a mode in which two components communicate through radio signals.

In addition, in the specification and claims, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value and the second value" indicate that the range includes the first value, the second value, and other values between the first value and the second value.

For convenience of description, unless otherwise specified, "in one direction" referred to hereinafter may represent "approximately or substantially in the direction" or "approximately or substantially in a direction opposite to the direction", while it is not limited thereto. In addition, there may be a deviation between the actual direction and the said direction within about 60 degrees (≤60°), while it is not limited thereto.

In addition, the technical features of different embodiments disclosed in the present disclosure may be combined to form another embodiment.

In addition, the electronic device disclosed in the present disclosure may include a display device, an antenna device, a sensing device, a touch display device, a curved display device, or a free shape display device, but is not limited thereto. The electronic device may be a bendable or flexible electronic device. The electronic device may include liquid crystals, light emitting diodes, fluorescence, phosphor, other suitable display media, or a combination thereof, but it is not limited thereto. The light emitting diodes may, for example, include organic light emitting diodes (OLEDs), mini light emitting diodes (mini LEDs), micro light emitting diodes (micro LEDs) or quantum dot (QD) light emitting diodes (which may be QLEDs or QDLEDs), or other suitable materials or any arrangement and combination of the above materials, but it is not limited thereto. The display device may, for example, include a tiled display device, but it is not limited thereto. The antenna device may be, for example, a liquid crystal antenna, but it is not limited thereto. The antenna device may include, for example, a tiled antenna device, but it is not limited thereto. It is noted that the electronic device may be any permutation and combination of the aforementioned, but it is not limited thereto. In addition, the shape of the electronic device may be rectangular, circular, polygonal, with curved edges, or other suitable shapes. The electronic device may have peripheral systems, such as a drive system, a control system, a light source system, a shelf system, etc., so as to support a display device, an antenna device or a tiled device. For the convenience of description, the electronic device will be described below as a display device, but the present disclosure is not limited thereto.

Figure 2:
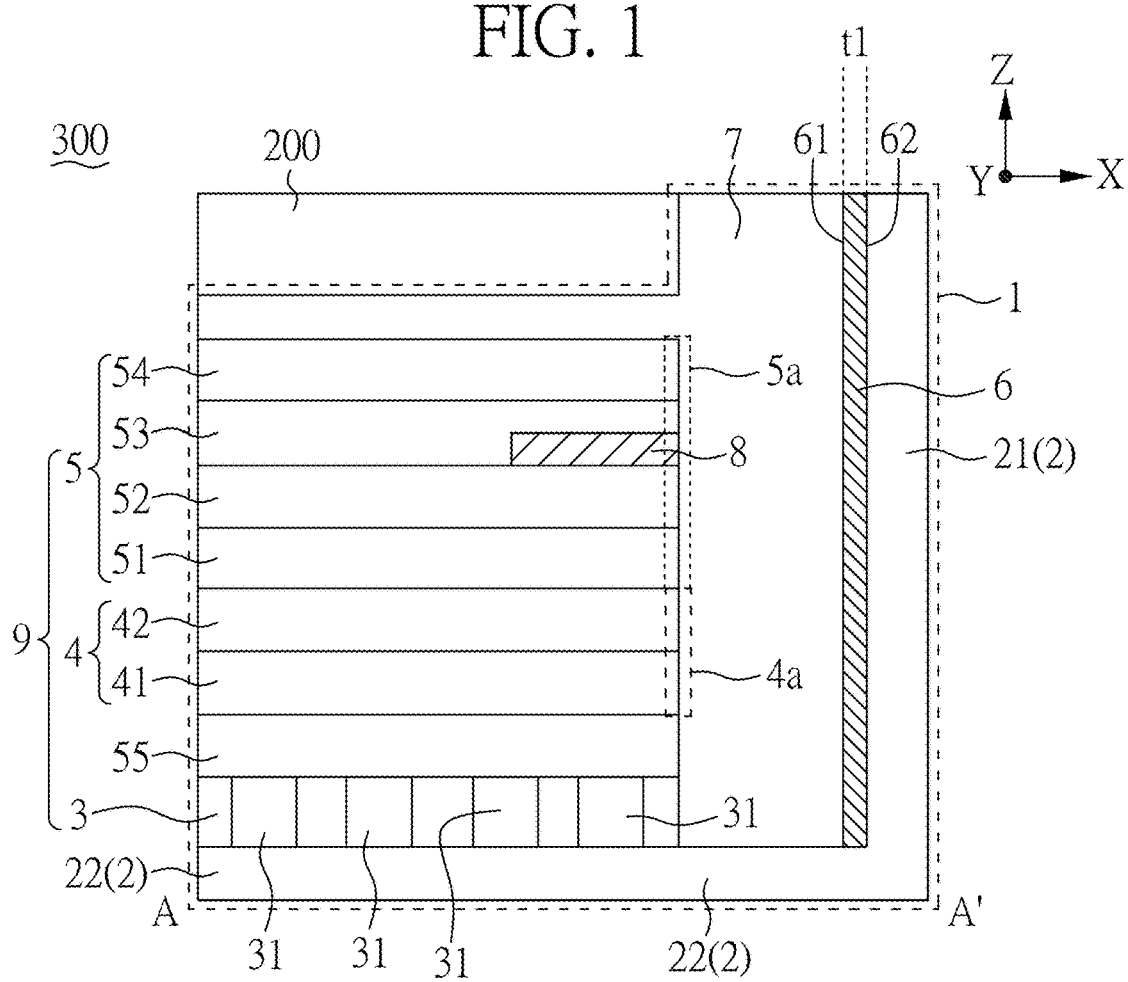
FIG. 2 is a schematic view illustrating the structure of the backlight module according to an embodiment of the present disclosure.

Please refer to FIG. 1 and FIG. 2. FIG. 1 is a schematic diagram of an electronic device 300 using the backlight module 1 according to an embodiment of the present disclosure, wherein the electronic device 300 may be, for example but not limited to, a display device. FIG. 2 is a schematic view illustrating the structure of the backlight module 1 according to an embodiment of the present disclosure, which shows a cross-section of the backlight module 1 corresponding to the line A-A' in FIG. 1. For the convenience of description, the directions in the drawings are defined below. A backlight direction of the backlight module 1 (such as a display direction of the electronic device 300) is defined as the Z direction, and one side 300a of the electronic device 300 may extend substantially in a first direction (such as the X direction) and the other side 300b of the electronic device 300 may extend substantially in a second direction (such as the Y direction), wherein the first direction (X) and the second direction (Y) may be respectively perpendicular to backlight direction (Z), while it is not limited thereto.

As shown in FIG. 1, the electronic device 300 includes a backlight module 1 and a display panel 200. As shown in FIG. 2, the backlight module 1 includes a back board 2, a lamp board 3, a wavelength conversion film 4, at least one optical film 5, a reflective component 6 and a coating layer 8. In addition, the backlight module 1 may further include a diffusion plate 55 and a light mixing area 7. For convenience of description, the lamp board 3, the diffusion plate 55, the wavelength conversion film 4 and the at least one optical film 5 are referred to as a light emitting portion 9. The display panel 200 is arranged on the backlight module 1 and, in the backlight direction (Z) (i.e., the direction in which the light emitting portion 9 faces the display panel 200), the display panel 200 at least partially overlaps the light emitting portion 9. In addition, in the backlight direction (Z), at least part of the light mixing area 7 is disposed between the display panel 200 and the light emitting portion 9.

In more detail, as shown in FIG. 2, the back board 2 includes a side wall 21. The lamp board 3 includes a plurality of light emitting units 31. In the backlight direction (Z), the lamp board 3 is arranged on the back board 2, the wavelength conversion film 4 is arranged on the light emitting units 31, the at least one optical film 5 is arranged on the wavelength conversion film 4, and the coating layer 8 is arranged on the at least one optical film 5 and adjacent to an edge 5a of the at least one optical film 5. In a first direction (X) perpendicular to the backlight direction (Z), the reflective component 6 is arranged between the side wall and the at least one optical film 5.

As shown in FIG. 1, viewed from a top view direction (the opposite direction of the backlight direction (Z)), the back board 2 surrounds the display panel 200, the reflective component 6 also surrounds the display panel 200, and the reflective component 6 is arranged between the display panel 200 and the back board 2. The light mixing area 7 is disposed between the reflective component 6 and the display panel 200. In addition, it is noted that, since the display panel 200 and the light emitting portion 9 overlap at least partially in the backlight direction (Z), the reflective component 6 may also surround the light emitting portion 9 when viewed from the top view direction, for example, surround the lamp board 3, the diffusion plate 55, the wavelength conversion film 4 and the at least one optical film 5, while it is not limited thereto.

Next, the details of each component will be described, and please refer to FIG. 2.

First, the back board 2 will be described. The back board 2 may include the side wall 21 and a base 22. In one embodiment, the side wall 21 may extend in the backlight direction (Z), and the base 22 may extend in the first direction (e.g., the X direction). In one embodiment, the material of the back board 2 may include metal (such as but not limited to iron, copper, aluminum, steel, etc.), alloy or plastic, or a combination thereof, while is not limited thereto. In addition, the shape of the back board 2 is not limited.

Next, the lamp board 3 and the light emitting units 31 will be described. In the backlight direction (Z), the lamp board 3 may be arranged on the base 22 of the back board 2. In the first direction (X), the light emitting units 31 may be arranged in an array, while it is not limited thereto. In one embodiment, the light emitting unit 31 may be, for example, a mini LED, but it is not limited thereto. In one embodiment, the light emitting unit 31 may emit blue light. In one embodiment, the wavelength of the light emitted by the light emitting unit 31 may be smaller than or equal to 500 nanometers (nm) (i.e., wavelength≤500 nm). In one embodiment, the light emitted by the light emitting unit 31 may have a wavelength between 400 nm and 500 nm (i.e., 400 nm≤wavelength≤500 nm). In one embodiment, the wavelength of the light emitted by the light emitting unit 31 may be between 430 nm and 475 nm (i.e., 430 nm≤wavelength≤475 nm). In one embodiment, the wavelength of the light emitted by the light emitting unit 31 may be between 448.5 nm and 451.5 nm (i.e., 448.5 nm≤wavelength≤451.5 nm), while it is not limited thereto. In addition, in other embodiments, the light emitting unit 31 may also emit ultraviolet light (UV), red light or green light, while it is not limited thereto.

Next, the wavelength conversion film 4 will be described. The wavelength conversion film 4 may include a blue light film (BLT film) 41 and a quantum dot film (QD film) 42. In the backlight direction (Z), the blue light film 41 is arranged on the light emitting units 31, and the quantum dot film 42 is arranged on the blue light film 41, while it is not limited thereto. The light (such as blue light) emitted by the light emitting units 31 may be converted into light of different wavelengths, such as red light or green light, through the wavelength conversion film 4, while it is not limited thereto. In addition, in one embodiment, the diffusion plate 55 may be arranged between the light emitting units 31 and the quantum dot film 41 of the wavelength conversion film 4.

Next, at least one optical film 5 will be described. The at least one optical film 5 may include a first optical film 51, a second optical film 52, a third optical film 53 and a fourth optical film 54, but it is not limited thereto. The first optical film 51 may be, for example but not limited to, a diffusion plate, the second optical film 52 may be, for example but not limited to, a lens, the third optical film 53 may be, for example but not limited to, a diffusion sheet, and the fourth optical film 53 may be, for example but not limited to, a lens, wherein the second optical film 52 and the fourth optical film 54 may be respectively bonded to the third optical film 53. The difference between "diffusion plate" and "diffusion sheet" is that the surface of the diffusion plate is provided with regularly arranged substructures (such as protrusions or depressions), while the surface of the diffusion sheet is flatter than that of the diffusion plate, but it is not limited thereto. It is noted that the aforementioned quantity of the at least one optical film 5 is only an example and, in actual application, a single optical film or other numbers of optical films may also be included.

In addition, on the backlight direction (Z), the first optical film 51 may be arranged on the quantum dot film 42, the second optical film 52 may be arranged on the first optical film 51, the third optical film 53 may be arranged on the second optical film 52, and the fourth optical film 54 may be arranged on the third optical film 53, while it is not limited thereto. In addition, the coating layer 8 may be arranged on one of the optical films 51-54, for example, may be arranged on the second optical film 52 or the third optical film 53, or arranged on the second optical film 52 or the third optical film 53, but it is not limited thereto. In addition, the coating layer 8 may be adjacent to the edge 5a of the at least one optical film 5, for example, adjacent to the edge 5a of the second optical film 52 or the third optical film 53, but it is not limited thereto.

Next, the reflective component 6 will be described. The reflective component 6 may have a first surface 61 and a second surface 62, wherein the first surface 61 may face the light emitting portion 9, for example, face the lamp board 3, the diffusion plate 55, the wavelength conversion film 4 and at least one optical film 5, and the second surface 62 may face the side wall 21 of the back board 2. In the embodiment of FIG. 2, the reflective component 6 is arranged on the side wall 21, for example, the second surface 62 may be bonded to the side wall 21.

The first surface 61 of the reflective component 6 has a brightness L*, a first chromaticity a* and a second chromaticity b*, wherein the brightness L*, the first chromaticity a* and the second chromaticity b* may be the brightness and chromaticity parameters of the CIE LAB color space proposed by the International Commission on Illumination (CIE).

In one embodiment, at an optical wavelength of 450 nm, the brightness L* of the first surface 61 may be between 70 and 100 (i.e., 70≤L*≤100). In one embodiment, at an optical wavelength of 450 nm, the brightness L* of the first surface 61 may be between 80 and 100 (i.e., 80≤L*≤100). In one embodiment, at an optical wavelength of 450 nm, the brightness L* of the first surface 61 may be between 88 and 100 (i.e., 88≤L*≤100). However, the present disclosure is not limited thereto.

In one embodiment, at an optical wavelength of 450 nm, the first chromaticity a* of the first surface 61 may be between −10 and 10 (i.e., −10≤a*≤10). In one embodiment, at an optical wavelength of 450 nm, the first chromaticity a* of the first surface 61 may be between −8 and 8 (i.e., −8≤a*≤8). In one embodiment, at an optical wavelength of 450 nm, the first chromaticity a* of the first surface 61 may be between −6 and 6 (i.e., −6≤a*≤6). However, the present disclosure is not limited thereto.

In one embodiment, at an optical wavelength of 450 nm, the second chromaticity b* of the first surface 61 may be between −10 and 10 (i.e., −10≤b*≤10). In one embodiment, at an optical wavelength of 450 nm, the second chromaticity b* of the first surface 61 may be between −8 and 8 (i.e., −8≤b*≤8). In one embodiment, at an optical wavelength of 450 nm, the second chromaticity b* of the first surface 61 may be between −6 and 6 (i.e., −6≤b*≤6). However, the present disclosure is not limited thereto.

In addition, it is noted that the aforementioned measurement of the brightness and chromaticity parameters of the CIE LAB color space may at least be measured by the measurement instrument ColorQuest XE using the measurement specification D65/10, but it is not limited thereto this.

In one embodiment, the reflective component 6 may be, for example, a silver adhesive tape, but it is not limited thereto. In one embodiment, the reflective component 6 may be, for example, an adhesive tape with a model number of TS50C-K, but it is not limited thereto. In one embodiment, the brightness L* of the reflective component 6 may be 94.02~94.07, the first chromaticity a* thereof may be −0.22~−0.26, and the second chromaticity b* thereof may be −0.34~−0.37, but it is not limited thereto. In one embodiment, when the reflective component 6 is an adhesive tape, the reflective component 6 has a thickness t1 in the first direction (X). In one embodiment, the thickness t1 of the reflective component 6 is smaller than or equal to 0.1 millimeter (mm) (i.e., 0 mm<t1≤0.1 mm). In one embodiment, the thickness t1 of the reflective component 6 is smaller than or equal to 0.075 mm (i.e., 0 mm<t1≤0.075 mm). In one embodiment, the thickness t1 of the reflective component 6 is smaller than or equal to 0.05 mm (i.e., 0 mm<t1≤0.05 mm). The aforementioned numerical values are only examples but not limitations.

Next, the light mixing area 7 will be described. In one embodiment, in the backlight direction (Z), part of the light mixing area 7 may be disposed between the at least one optical film 5 and the display panel 200, for example, between the fourth optical film 54 and the display panel 200. In addition, in the first direction (X), part of the light mixing area 7 may be disposed between the reflective component 6 and the light emitting portion 9. In one embodiment, the light emitted by the light emitting units 31 may pass through the light emitting portion 9 and enter the light mixing area 7. When light of different wavelengths enters the light mixing area 7, the light may be mixed, for example, to generate white light, but it is not limited thereto.

Next, the coating layer 8 will be described. In one embodiment, the coating layer 8 may be, for example, printed with ink of a specific color (e.g., yellow) and arranged on the at least one optical film 5, but it is not limited thereto. In one embodiment, the thickness of the coating layer 8 may be between 0.001 mm and 0.05 mm, but it is not limited thereto.

In the prior backlight module, the light emitting unit emits light of a single color, such as blue light, which may not be converted completely when passing through the wavelength conversion film, or may not be mixed completely in the light mixing area, so that chromatic aberration, such as bluishness, may be generated in the edge area (for example, at the outer edge) of the backlight module. By setting a specific color coating on the optical film of the backlight module, such as a yellow coating, the problem of bluishness in the edge area may be reduced. However, because the side wall surface of the back board of the backlight module is usually uneven, light reflections in multiple directions may occur when light passes through the side wall surface, resulting in dark edge area, or another chromatic aberration problem at a specific viewing angle, such as yellowing, which will degrade the optical quality of the edge area of the backlight module or electronic device.

In this regard, the present disclosure provides the reflective component 6 with specific brightness L*, first chromaticity a* and second chromaticity b* between the side wall 21 and the light emitting portion 9 of the backlight module 1, so that light is directly reflected on the reflective component 6 thereby reducing the aforementioned yellowing phenomenon and thus improving the brightness of the edge area. Alternatively, the aforementioned problem of chromatic aberration at specific viewing angles may be reduced. As a result, the problems in the prior art may be solved, and the optical quality of the edge area of the backlight module 1 or the electronic device 300 may be improved.

Figure 3:
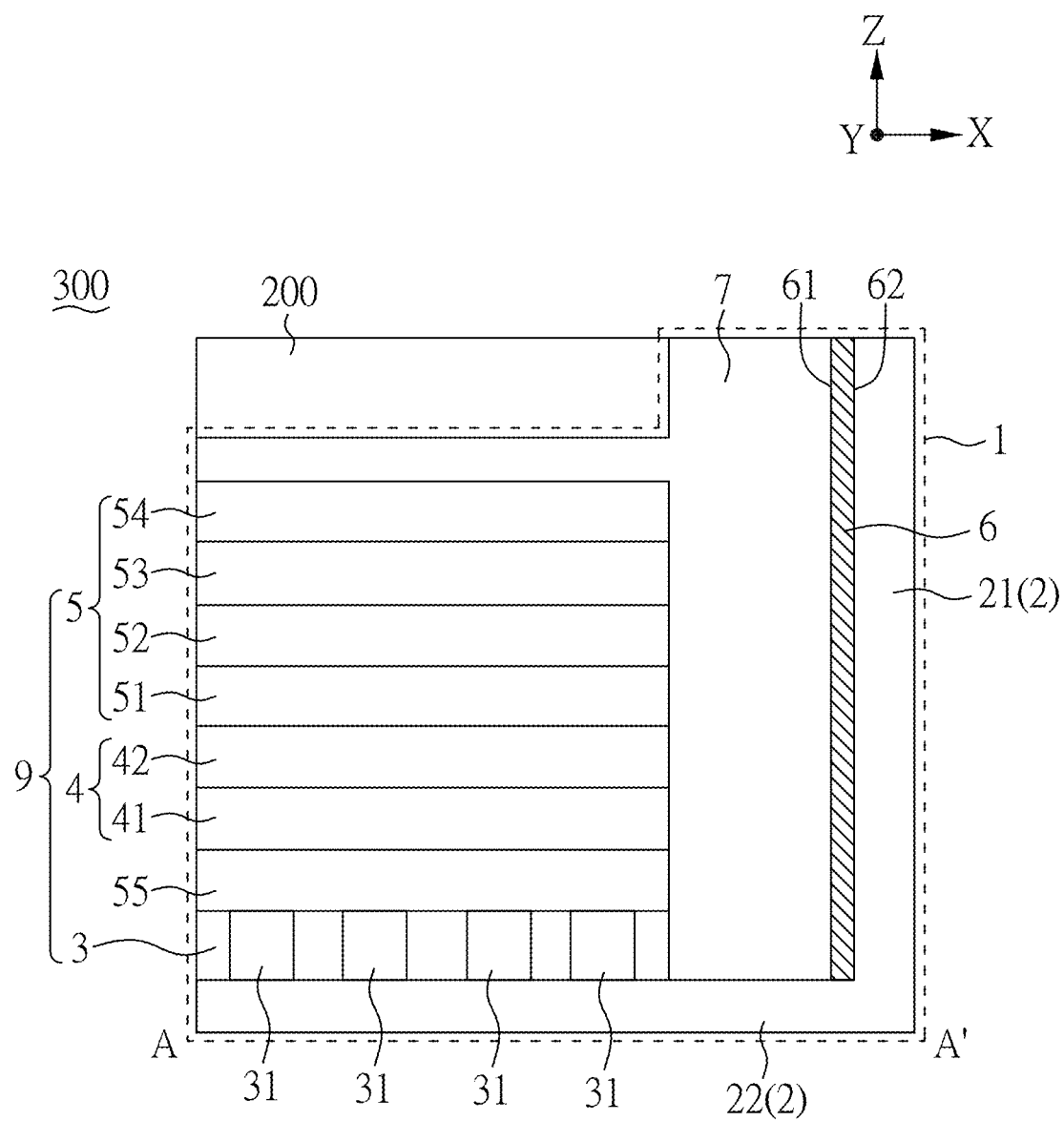
FIG. 3 is a schematic view illustrating the structure of the backlight module according to another embodiment of the present disclosure.

The backlight module 1 of the present disclosure may also have different configurations, and please refer to FIG. 1 to FIG. 3. FIG. 3 is a schematic view illustrating the structure of the backlight module 1 according to another embodiment of the present disclosure, which shows a cross-section of the backlight module 1 of FIG. 1 taken along line A-A'.

As shown in FIG. 3, the backlight module 1 may include a back board 2, a lamp board 3, a wavelength conversion film 4, at least one optical film 5, a reflective component 6, a diffusion plate 55 and a light mixing area 7, while it is not limited thereto. The lamp board 3 may include a plurality of light emitting units 31. The wavelength conversion film 4 may include a blue light film 41 and a quantum dot film 42. The at least one optical film 5 may include a first optical film 51, a second optical film 52, a third optical film 53 and a fourth optical film 54, but it is not limited thereto. The features of the aforementioned components are generally applicable to the description of the embodiment of FIG. 2, and thus the following description will mainly focus on the differences.

In comparison with the embodiment of FIG. 2, the backlight module 1 in the embodiment of FIG. 3 may not be provided with a coating layer 8. In addition, the brightness L*, first chromaticity a* and second chromaticity b* of the reflective component 6 are also different from those in the embodiment of FIG. 2.

In one embodiment, at an optical wavelength of 450 nm, the brightness L* of the first surface 61 of the reflective component 6 may be between 70 and 100 (i.e., 70≤L*≤100). In one embodiment, at an optical wavelength of 450 nm, the brightness L* of the first surface 61 may be between 80 and 100 (i.e., 80≤L*≤100). In one embodiment, at an optical wavelength of 450 nm, the brightness L* of the first surface 61 may be between 88 and 100 (i.e., 88≤L*≤100). However, the present disclosure is not limited thereto.

In one embodiment, at an optical wavelength of 450 nm, the first chromaticity a* of the first surface 61 may be between −10 and 10 (i.e. −10≤a*≤10). In one embodiment, at an optical wavelength of 450 nm, the first chromaticity a* of the first surface 61 may be between −8 and 8 (i.e. −8≤a*≤8). In one embodiment, at an optical wavelength of 450 nm, the first chromaticity a* of the first surface 61 may be between −6 and 6 (i.e. −6≤a*≤6). However, the present disclosure is not limited thereto.

In one embodiment, at an optical wavelength of 450 nm, the second chromaticity b* of the first surface 61 may be between 10 and 40 (i.e., 10≤b*≤40). In one embodiment, at an optical wavelength of 450 nm, the second chromaticity b* of the first surface 61 may be between 15 and 35 (i.e., 15≤b*≤35). In one embodiment, at an optical wavelength of 450 nm, the second chromaticity b* of the first surface 61 may be between 20 and 30 (i.e., 20≤b*≤30). However, the present disclosure is not limited thereto.

In the embodiment of FIG. 3, the reflective component 6 may be, for example, a golden adhesive tape, but it is not limited thereto. In one embodiment, the golden adhesive tape may be, for example, an adhesive tape with a model of TLG, but it is not limited thereto. In one embodiment, the brightness L* of the reflective component 6 may be 90.2~90.4, the first chromaticity a* may be −5.24~5.32, and the second chromaticity b* may be 34.52~34.91, but it not limited thereto. In addition, in one embodiment, the color of the reflective component 6 may be set as the contrasting color of the light emitted by the light emitting unit 31, where the "contrasting color" means that two lights may be mixed to form white light, but it is not limited thereto.

It can be seen that, through the reflective component 6 with suitable brightness L*, first chromaticity a* and second chromaticity b* arranged between the side wall 21 and the light emitting portion 9, light may be reflected by the reflective component 6, thereby reducing the yellowing phenomenon, so that the brightness of the edge of the backlight module 1 may be improved. Alternatively, by setting the reflective component 6 with specific brightness L*, first chromaticity a* and second chromaticity b*, the bluish phenomenon in the edge area may be reduced without providing the coating layer 8, while yellowing phenomenon will not appear at specific viewing angles. As a result, the optical quality of the edge area of the backlight module 1 or the electronic device 300 may be improved.

As a result, the structure of the backlight module 1 of the present disclosure can be understood.

Figure 4:
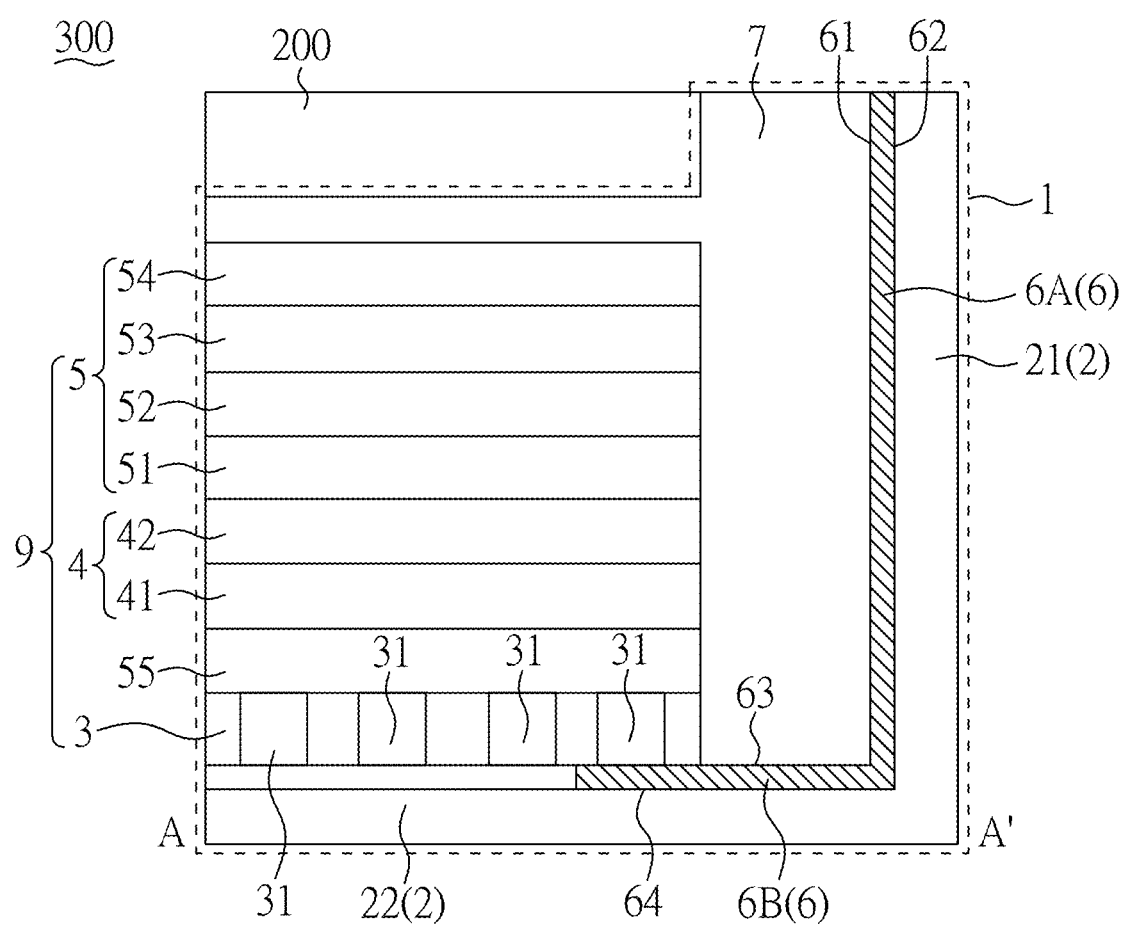
FIG. 4 is a schematic view illustrating the configuration of the reflective component according to an embodiment of the present disclosure.

The reflective component 6 of the present disclosure may also have different implementation aspects. FIG. 4 is a schematic view illustrating the configuration of the reflective component 6 according to an embodiment of the present disclosure, and please refer to FIG. 1 to FIG. 3 at the same time. The following implementation aspects of the reflective component 6 may also be implemented in the embodiment of FIG. 2 or the embodiment of FIG. 3.

As shown in FIG. 4, the reflective component 6 may extend below the lamp board 3. For example, the reflective component 6 may include a first portion 6A and a second portion 6B. In the first direction (X), the first portion 6A is disposed between the light emitting portion 9 and the side wall 21. In addition, the first portion 6A may extend along the backlight direction (Z). In the backlight direction (Z), the second portion 6B is disposed between the lamp board 3 and the base 22. In addition, the second portion 6B may extend along the first direction (X).

In one embodiment, the first portion 6A may include a first surface 61 and a second surface 62, wherein the first portion 6A is abutted against the side wall 21, such as being in contact with the side wall 21, but it is not limited thereto. In one embodiment, the second portion 6B may include a third surface 63 and a fourth surface 64, wherein in the backlight direction (Z), the third surface 63, the lamp board 3 and the base 22 at least partially overlap, but it is not limited thereto.

Figure 5:
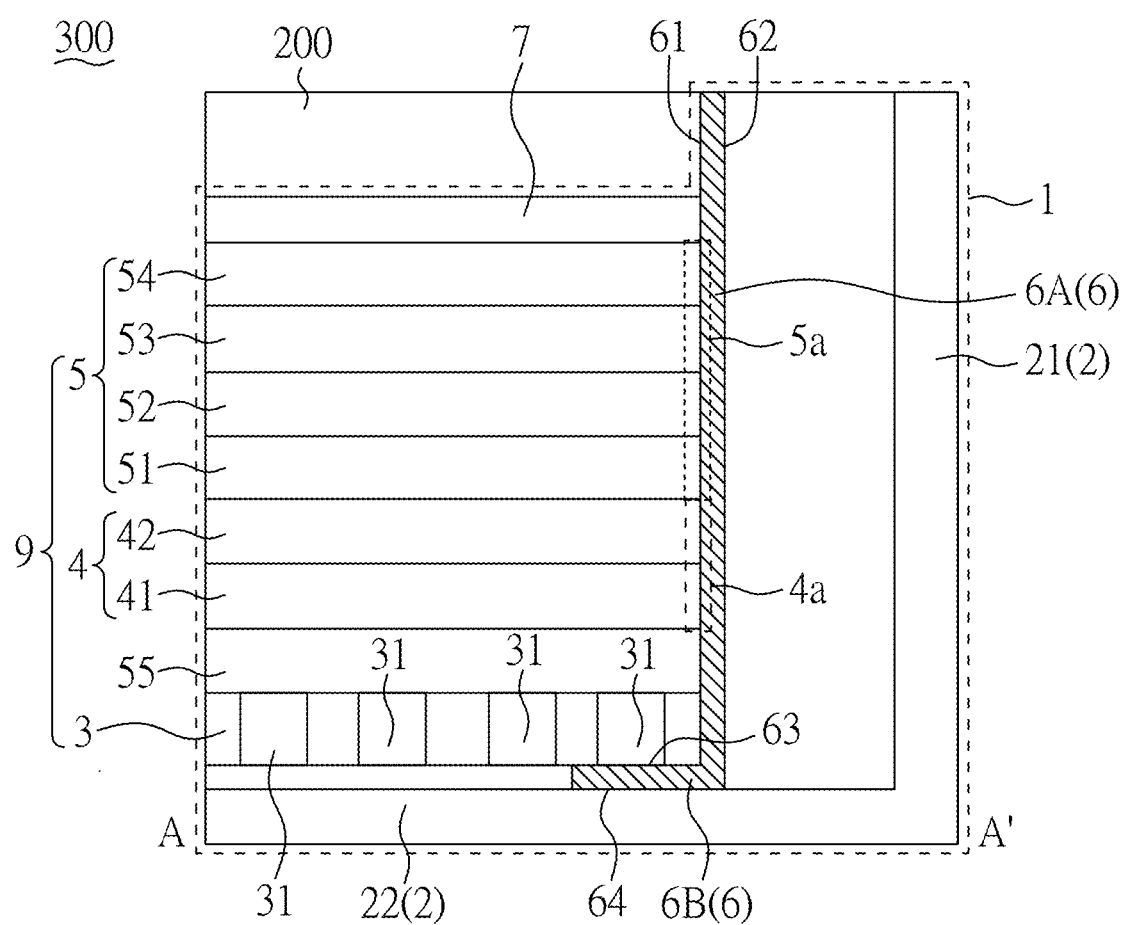
FIG. 5 is a schematic view illustrating the configuration of the reflective component according to another embodiment of the present disclosure.

The reflective component 6 may also have different implementation aspects. FIG. 5 is a schematic view illustrating the configuration of the reflective component 6 according to another embodiment of the present disclosure, and please refer to FIG. 1 to FIG. 4 at the same time. The following implementation aspects of the reflective component 6 may also be implemented in the embodiment of FIG. 2 or the embodiment of FIG. 3.

Some features of the embodiment of FIG. 5 are applicable to the description of the embodiment of FIG. 4, and thus the following descriptions are mainly focused on the differences.

As shown in FIG. 5, the first portion 6A of the reflective component 6 is bonded to the light emitting portion 9, for example, the first surface 61 of the reflective component 6 may be bonded to the edge 5a of the at least one optical film 5, and the first surface 61 may be bonded to the edge 4a of the wavelength conversion film 4, but it is not limited thereto. In addition, in the backlight direction (Z), the second portion 6B of the reflective component 6 is arranged between the lamp board 3 and the base 22. In addition, in other embodiments, the reflective component 6 may not extend below the lamp board 3.

Accordingly, as the reflective component 6 in the embodiment of FIG. 5 may be bonded to at least part of the bottom and side of the light emitting portion 9, it is able to make the narrow bezel effect of the electronic device 300 more obvious.

Figure 6:
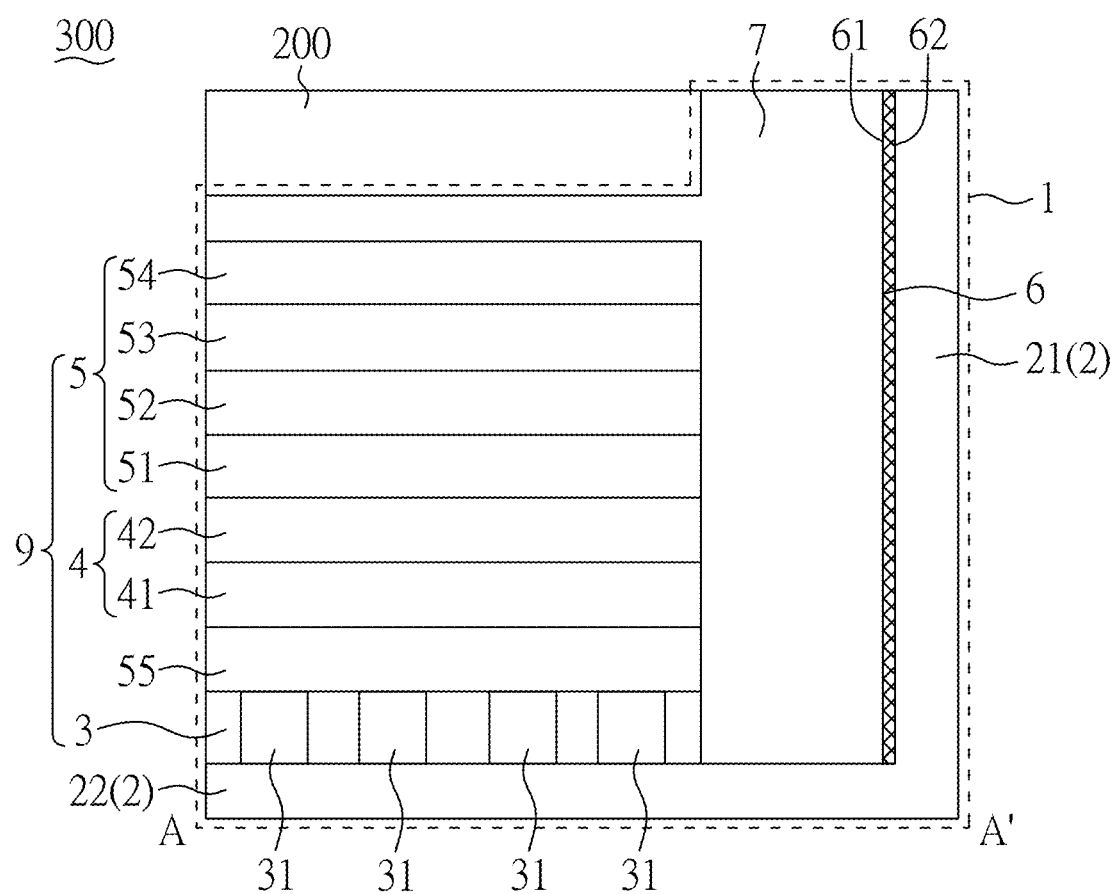
FIG. 6 is a schematic view illustrating the configuration of the reflective component according to still another embodiment of the present disclosure.

FIG. 6 is a schematic view illustrating the configuration of the reflective component 6 according to still another embodiment of the present disclosure, and please refer to FIG. 1 to FIG. 3 at the same time. The following implementation aspects of the reflective component 6 may also be implemented in the embodiment of FIG. 2 or the embodiment of FIG. 3.

As shown in FIG. 6, the inner surface of the side wall 21 (the side facing the light emitting portion 9) may be performed with a surface treatment, such as spraying or electroplating, so as to form a reflective layer, which may be used as a reflective component 6. In other words, the reflective component 6 may include a coating layer or an electroplating layer arranged on the inner surface of the side wall 21, but it is not limited thereto.

Figure 7:
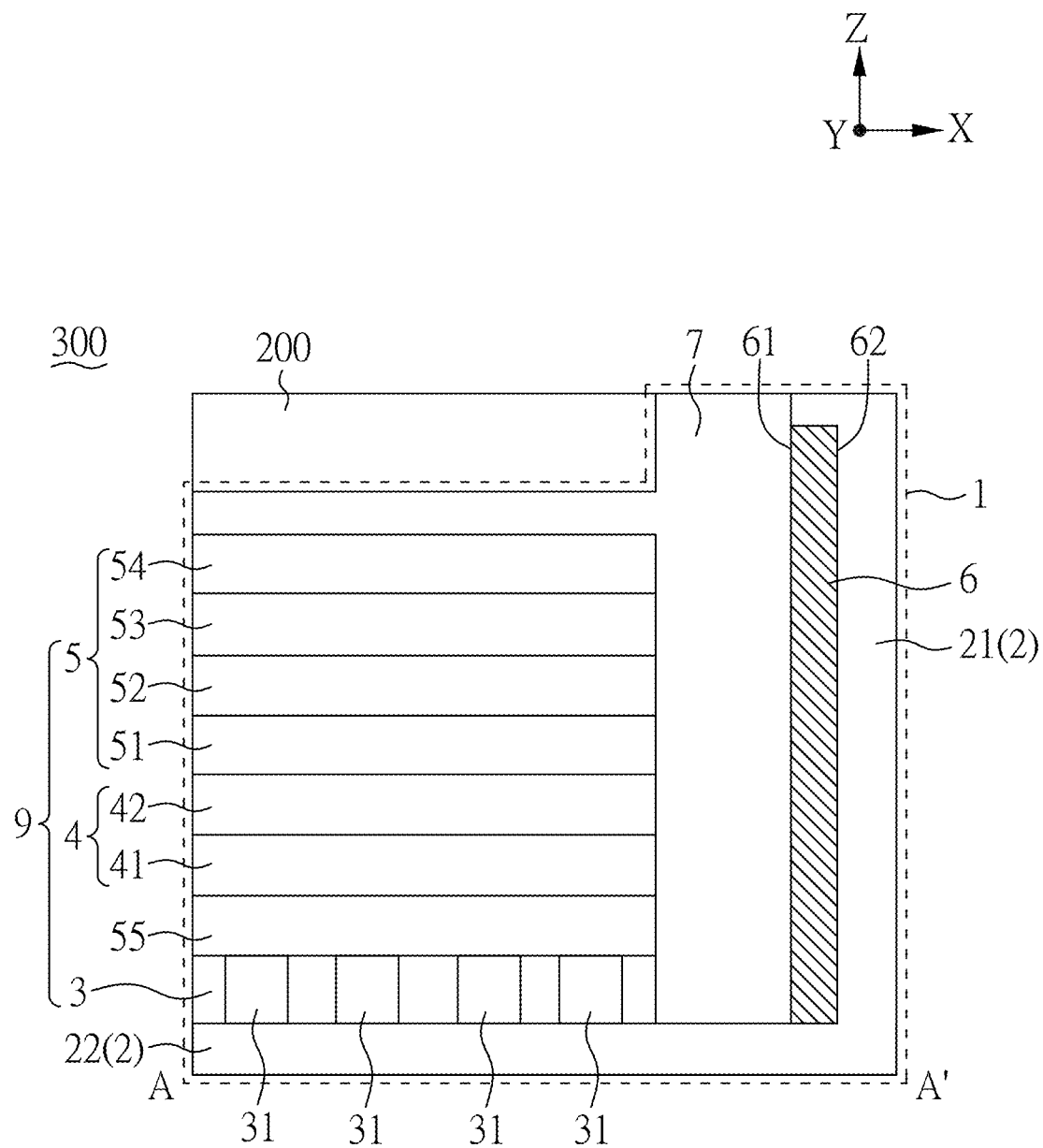
FIG. 7 is a schematic view illustrating the configuration of the reflective component according to yet another embodiment of the present disclosure.

FIG. 7 is a schematic view illustrating the configuration of the reflective component 6 according to yet another embodiment of the present disclosure, and please refer to FIG. 1 to FIG. 3 at the same time. The following implementation aspects of the reflective component 6 are applicable to the embodiment of FIG. 2 and the embodiment of FIG. 3.

As shown in FIG. 7, the reflective component 6 may be embedded in the side wall 21, wherein the first surface 61 of the reflective component 6 may be exposed on the side wall 21 and face the light emitting portion 9.

Accordingly, different aspects of the reflective component 6 can be understood.

It is noted that, although a direct-type backlight module is taken as an example for the backlight module 1 of the aforementioned embodiments, the backlight module 1 may also be a side-type backlight module, while it is not limited thereto.

In one embodiment, the present disclosure may at least compare the backlight module 1 with an object in a mechanism-observable manner to determine whether the object falls under the patent protection of the present disclosure by, for example, the presence or absence of components and/or the arrangement of components, while it is not limited thereto.

Accordingly, with the backlight module 1 of the present disclosure, it may reduce the problem of darkening or chromatic aberration in the edge area. Alternatively, the backlight module 1 may be applied to the electronic device 300 with a narrow bezel.

The details or features of the various embodiments disclosed in the present disclosure may be mixed and matched as long as they do not violate the spirit of the disclosure or conflict with each other.

The aforementioned specific embodiments should be construed as merely illustrative, and not limiting the rest of the present disclosure in any way.

The invention claimed is:

1. An electronic device, comprising:
a back board including a base, a side portion, and a top portion, wherein in a cross section view, an extension direction of the side portion is different from an extension direction of the base and an extension direction of the top portion; wherein an end of the side portion is connected to the base and another end of the side portion is connected to the top portion;
a plurality of light emitting units arranged on the base;
an optical film arranged on the plurality of light emitting units; and
a reflective component arranged on the base and including a first surface,
wherein in a normal direction of the electronic device, a distance between a top surface of the top portion and a top surface of the base is greater than a distance between a top surface of the optical film and the top surface of the base, and a thickness of the reflective component is less than a thickness of the side portion;
wherein a color measurement according to the CIE, the first surface of the reflective component has a brightness ranging from 70 to 100, a first chromaticity ranging from −10 to 10, and a second chromaticity ranging from −10 to 10; and
wherein in the normal direction of the electronic device, the optical film overlaps the plurality of light emitting units.

2. The electronic device as claimed in claim 1, wherein the top portion overlaps the first surface of the reflective component.

3. The electronic device as claimed in claim 1, wherein the top portion overlaps the base.

4. The electronic device as claimed in claim 1, wherein the reflective component is accommodated in the back board.

5. The electronic device as claimed in claim 1, wherein in the normal direction of the electronic device, the distance between the top surface of the top portion and the top surface of the base is greater than a distance between a top surface of the reflective component and the top surface of the base.

6. The electronic device as claimed in claim 1, wherein in a horizontal direction of the electronic device, a gap is between the optical film and the first surface of the reflective component.

* * * * *